United States Patent [19]
Doumuki et al.

[11] Patent Number: 5,459,807
[45] Date of Patent: Oct. 17, 1995

[54] OPTICAL WAVEGUIDE DEVICE AND SECOND HARMONIC GENERATOR USING THE SAME

[75] Inventors: Tohru Doumuki; Hitoshi Tamada; Masaki Saitoh, all of Kanagawa, Japan

[73] Assignee: Sony Corporation, Tokyo, Japan

[21] Appl. No.: 193,523

[22] Filed: Feb. 8, 1994

[30] Foreign Application Priority Data

Feb. 8, 1993 [JP] Japan ................................. 5-020420

[51] Int. Cl.⁶ ...................................... G02B 6/12
[52] U.S. Cl. ..................... 385/129; 385/14; 385/122; 385/130; 385/131; 385/132; 385/28; 359/326; 359/332; 359/328
[58] Field of Search .................... 385/14, 122, 129, 385/130, 131, 132, 28; 359/326, 328, 329, 330, 332

[56] References Cited

U.S. PATENT DOCUMENTS

| | | | |
|---|---|---|---|
| 3,563,630 | 2/1971 | Anderson et al. | 385/122 X |
| 4,896,931 | 1/1990 | Khurgin | 385/129 |
| 4,973,117 | 11/1990 | Yamada | 385/122 X |
| 5,117,433 | 5/1992 | Tatsuno et al. | 372/22 |
| 5,158,823 | 10/1992 | Enomoto et al. | 385/122 X |
| 5,168,388 | 12/1992 | Tamada et al. | 359/328 |
| 5,343,484 | 8/1994 | Mori et al. | 385/122 X |

FOREIGN PATENT DOCUMENTS

0433487  6/1991  European Pat. Off. .......... 385/122 X
0452828  10/1991  European Pat. Off. .......... 385/122 X

OTHER PUBLICATIONS

*Patent Abstracts of Japan*, vol. 11, No. 375, 8 Dec. 1987, Taniuchi Tetsuo et al. "Optical Wavelength Converter".
*Applied Physics Letters*, vol. 58, No. 1, pp. 19–21 7 Jan. 1991, W. P. Risk "Fabrication and characterization of planar ion–exchanged KTiOPO₄ waveguides for frequency doubling".

*Primary Examiner*—Brian Healy
*Attorney, Agent, or Firm*—Hill, Steadman & Simpson

[57] ABSTRACT

An optical waveguide device for use as a second harmonic generator includes a nonlinear optical crystalline substrate of $KTiOPO_4$ and an optical waveguide core of a dielectric material, such as $Ta_2O_5$, disposed on the nonlinear optical crystalline substrate. The optical waveguide converts a fundamental wave having a wavelength $\lambda$ which is guided through the optical waveguide into a second harmonic wave having a wavelength $\lambda/2$, the second harmonic wave having the same polarization as the fundamental wave which is guided through the optical waveguide. The optical waveguide has a thickness of 190 nm or greater. The optical waveguide device also has a dielectric loaded strip disposed on the optical waveguide core. The dielectric loaded strip may be made of $SiO_2$ or $SiO_2$ doped with $Ta_2O_5$. Alternatively, the optical waveguide may be a ridge-type optical waveguide, and the optical waveguide device may also has a cladding layer disposed on the nonlinear optical crystalline substrate and the optical waveguide core.

10 Claims, 7 Drawing Sheets

OPTICAL WAVEGUIDE DEVICE AND SECOND HARMONIC GENERATOR USING THE SAME

BACKGROUND OF THE INVENTION

1. Field of the Invention

The present invention relates to an optical waveguide device for use as a wavelength converter or a second harmonic generator for converting fundamental light into a second harmonic wave having the wavelength which is half that of the fundamental wave, and more particularly to an optical waveguide device for use as a light source for applying a short-wavelength coherent light beam to an optical disc to record information thereon at a high recording density.

2. Description of the Related Art

Optical waves that can be guided in the optical waveguide are limited to an intrinsic mode having discrete propagation constants and can be distinguished by modal orders 0, 1, 2, . . . In general, nth-order intrinsic mode has n nodes in its electric field distribution and an intensity distribution of a far field pattern of light emitted from the waveguide has n nodes accordingly. The existence of nodes is very disadvantageous particularly for devices which focus the emitted light. Therefore, it is customary that optical waveguide devices are designed to utilize a 0th-order waveguide light in which no nodes exist. Wavelength converters using an optical waveguide, for example, are known as one of such optical waveguide devices. In this case, the above-mentioned characteristic imposes a large restriction on designing the devices.

There have been known optical waveguide devices for use as wavelength converters or second harmonic generators for converting fundamental wave having a wavelength $\lambda$ into a second harmonic wave having a wavelength $\lambda/2$. The conventional optical waveguide devices are typically classified into three types depending on how the phase matching condition is achieved to generate the second harmonic wave efficiently.

The optical waveguide devices in the first category are known as optical waveguide devices of the guided mode type. In the optical waveguide devices of the guided mode type, phase matching is accomplished by bringing the effective refractive index of a fundamental guided mode and the effective refractive index of a second harmonic guided mode into agreement with each other by using modal dispersions. Nonlinear optical materials which satisfy such a condition are limited, and there have been known no optical materials that would practically achieve a high conversion efficiency in the optical waveguide devices of this group. Also, even when the phase-matching condition is satisfied, a resultant second harmonic wave becomes a high-order waveguide mode of first-order or greater in most cases and is not suitable for being focused in use.

The second class of optical waveguide devices is referred to as quasi-phase matching (QPM) optical waveguide devices which achieve quasi-phase matching by periodically inverting the spontaneous polarization of a nonlinear optical material. The QPM optical waveguide devices are advantageous in that there is available a wide range of optical materials to choose from relatively freely, and a high conversion efficiency can be expected and the 0th-order mode can be used. However, since they require a minute periodic inverted structure to be formed in themselves, a strict control process is needed in the fabrication of the QPM optical waveguide devices. It is difficult to manufacture the QPM optical waveguide devices with good reproducibility with the present fabrication technology.

The optical waveguide devices which belong to the third kind are called Cerenkov-radiation optical waveguide devices that convert a fundamental guided mode into a second harmonic radiation mode. The Cerenkov-radiation optical waveguide devices are advantageous in that the phase matching condition therefor is much looser than those for the optical waveguide devices of the first and second types, and they are simple in structure. However, their conversion efficiency is comparatively low, and they fail to produce a high second harmonic optical output power. Another problem of the Cerenkov-radiation optical waveguide devices is their poor focus characteristics because of a specially shaped pattern of radiation.

As described above, there is available only a limited range of optical materials for the optical waveguide devices which achieve phase matching of the guided mode type. Presently reported examples of such materials are as follows:

"Applied Physics Letters", vol. 24, p. 222~ (1974), shows an optical waveguide device comprising a linear thin-film waveguide of $TiO_2$ formed on a nonlinear optical crystalline substrate of quartz. The optical waveguide device converts a fundamental wave having a wavelength of 1.06 μm in a $TE_0$ (0th order) into a second harmonic wave in a $TE_0$ mode (0th order). Since the nonlinear optical coefficient of the substrate is very small, the second harmonic wave has an output power of about 10 mW when the fundamental wave has an input power of 100 W. Therefore, the optical waveguide device has a conversion efficiency of only about $10^{-6}\%$ and is not particularly usable. This article does not report the generation of a second harmonic wave having a wavelength of blue region from a fundamental wave having a wavelength of 1.0 μm or shorter.

"Optics Communications", vol. 15, p. 104~ (1975), discloses another optical waveguide device comprising a nonlinear thin-film waveguide of ZnS formed on a nonlinear substrate of $LiNbO_3$. The optical waveguide device converts a fundamental wave having a wavelength of 1.1 μm in a $TE_0$ mode into a second harmonic wave in a $TE_2$ (2nd order). However, the conversion efficiency is very low as the second harmonic wave has an output power of about 5 μW when the fundamental wave has an input power of 70 W. No blue light is produced as the second harmonic wave. Also, the resultant second harmonic wave is in the second-order mode.

"Journal of Crystal Growth", vol. 45, p. 355~ (1978), discloses still another optical waveguide device comprising a nonlinear thin-film waveguide of $LiNbO_3$ formed on a linear substrate of MgO. The optical waveguide device converts fundamental waves having respective wavelengths of 1.06 μm and 0.86 μm in a $TM_0$ mode into second harmonic waves in a $TM_1$ mode (1st order) and a $TM_2$ mode (2nd order). However, the conversion efficiency is also very low as the second harmonic wave has an output power of about 1 μW when the fundamental wave has an input power of 10 mW, and only a second harmonic wave of high-order can be obtained.

The reported optical waveguide devices which generate a second harmonic wave of the same polarization by phase matching of the guided mode type have an impractical low conversion efficiency. Their conversion efficiency at the time they convert a fundamental wave into a second harmonic wave in a short wavelength range, such as blue light, is extremely low. Further, the second harmonic wave becomes a high-order mode and nodes are produced in the intensity distribution of emitted light. Therefore, the above optical waveguide device is not suitable for use as the wavelength converter.

For the above reasons, almost no optical waveguide devices of the guided mode type have subsequently been reported so far. Rather, research efforts have been directed to optical waveguide devices which achieve phase matching of the QPM type that can generate a second harmonic wave of a 0th-order mode because of greater freedom for the selection of available optical materials.

A present theme assigned to the QPM type is to manufacture devices with excellent reproducibility.

As described above, in the conventional optical waveguide device, since a guided light of high-order mode has nodes corresponding to orders in the intensity distribution of the emitted light, such nodes are large restriction in designing a wavelength converter which is one of the examples to which the optical waveguide devices are applied.

OBJECTS AND SUMMARY OF THE INVENTION

It is therefore an object of the present invention to provide an optical waveguide device in which no nodes exist in an intensity distribution of emitted light of guided light of high-order mode.

According to an aspect of the present invention, there is provided an optical waveguide device in which a refractive index of an optical material forming an optical waveguide core is selected to be larger than that of an optical material forming a substrate by 0.1 or greater and in which a thickness or width of the optical waveguide core is selected to be smaller than a wavelength of guided light in the air.

According to another aspect of the present invention, there is provided an optical waveguide device in which at least one of the substrate and the optical waveguide core is made of a nonlinear optical crystal substrate so that a fundamental wave having a wavelength $\lambda$ guided in the optical waveguide core is converted into a second harmonic wave having a wavelength $\lambda/2$ of the same polarization as the fundamental wave which is similarly guided in the optical waveguide core.

The nonlinear optical crystalline substrate may be made of $KTiOPO_4$. The dielectric material may comprise $Ta_2O_5$.

The optical waveguide device may further be comprised of a dielectric loaded strip disposed on the optical waveguide core. The dielectric loaded strip may be made of $SiO_2$ or $SiO_2$ doped with $Ta_2O_5$.

Alternatively, the optical waveguide may be comprised of a ridge-type optical waveguide, and the optical waveguide device may further be comprised of a cladding layer disposed on the nonlinear optical crystalline substrate and the optical waveguide core. The cladding layer may be made of $SiO_2$ or $SiO_2$ doped with $Ta_2O_5$.

The optical waveguide may have a thickness of at least 190 nm.

According to the present invention, even when a guided-wave mode is the high-order mode of first-order or greater, the guided light is confined in a range smaller than the wavelength thereof in the air in the optical waveguide core and then guided in the optical waveguide device. Thus, when the guided light is emitted to the outside, it has an intensity distribution of a single peak response having no nodes.

Further, according to the present invention, if the substrate is made of the nonlinear optical crystalline substrate and is applied to the wavelength converter based on this optical waveguide device, then a portion of the fundamental wave having the wavelength $\lambda$ that was introduced into the optical waveguide is converted into the second harmonic wave having the wavelength $\lambda/2$ in the optical waveguide core, and this second harmonic wave is guided in the optical waveguide core and emitted to the outside.

In this case, even when the generated second harmonic wave is in the high-order mode having nodes, such second harmonic wave is confined in a region smaller than the wavelength thereof in the air in the optical waveguide core and guided. Thus, when the second harmonic wave is emitted to the outside, it has an intensity distribution of single peak response having no nodes. Therefore, the optical waveguide device according to this invention can be suitable for use as the wavelength converter.

When a fundamental wave having a wavelength $\lambda$ is introduced into the optical waveguide and guided therethrough, a portion of the fundamental wave is converted into a second harmonic wave having a wavelength $\lambda/2$, which is emitted out of the optical waveguide.

Phase matching which is achieved for such optical conversion is of the guided mode type wherein the effective refractive index of a fundamental guided mode and the effective refractive index of a second harmonic guided mode are brought into agreement with each other by modal dispersions.

If the nonlinear optical crystalline substrate is made of KTP, in case of the fundamental wave and the second harmonic wave have the same polarization, the optical waveguide device according to the present invention can convert an inputted fundamental TE mode into a second harmonic TE mode, and also can convert an inputted fundamental TM mode into a second harmonic TM mode. Therefore, the largest nonlinear optical coefficient $d_{33}$ among the nonlinear optical coefficients of KTP can contribute to increasing a wavelength conversion efficiency, with the result that the conversion efficiency with which the fundamental wave is converted into the second harmonic wave is greatly increased.

When the nonlinear optical crystalline substrate was made of KTP and the dielectric material of the optical waveguide core was $Ta_2O_5$, the optical waveguide device according to the present invention was able to convert a fundamental wave having a wavelength of 830 nm and a power of 71 mW into a second harmonic wave having a wavelength of 415 nm and a power of 5.4 mW and polarized in the same direction as the fundamental wave. The normalized conversion efficiency of the optical waveguide device was 640%/$Wcm^2$.

As described above, according to the present invention, the optical waveguide device can generate light having an intensity distribution of single peak response having no nodes even when the guided light is in the high-order mode. Therefore, when the optical waveguide device according to the present invention is applied to the wavelength converter, the optical waveguide device can generate a coherent light beam having a short wavelength which has a single peak intensity distribution.

Therefore, the optical waveguide device according to the present invention can generate a coherent light beam having a relatively short wavelength, and can be used as light source for applying such a coherent light beam to an optical disc to record information thereon at a high recording density.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
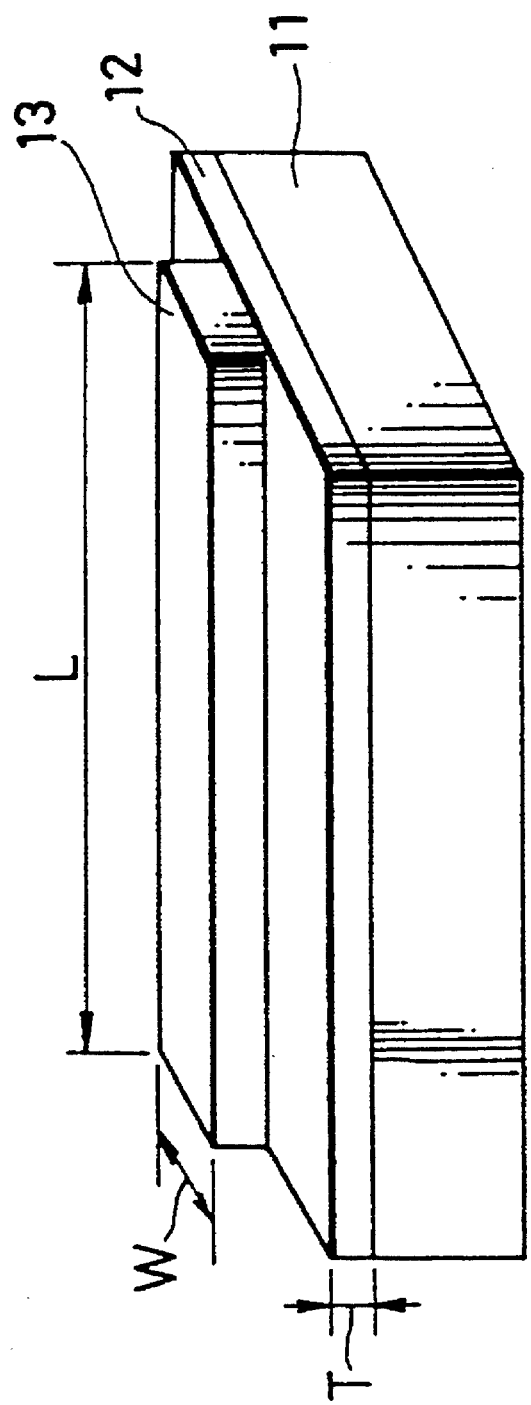
FIG. 1 is an enlarged schematic perspective view of an optical waveguide device according to an embodiment of the present invention.

As shown in FIG. 1, an optical waveguide device according to an embodiment of the present invention is comprised of a nonlinear optical crystalline substrate 11 in the form of a single-crystal a plate of KTP, i.e., a substrate having a planar surface lying perpendicularly to the a axis of a crystal, an optical waveguide core 12 in the form of a thin film of $Ta_2O_5$ deposited on the nonlinear optical crystalline substrate 11, and a dielectric loaded strip 13 disposed on the optical waveguide core 12, the dielectric loaded strip 13 being made of $SiO_2$ or $SiO_2$ doped with $Ta_2O_5$. The optical waveguide device is thus of the strip loaded optical waveguide type.

Figure 2:
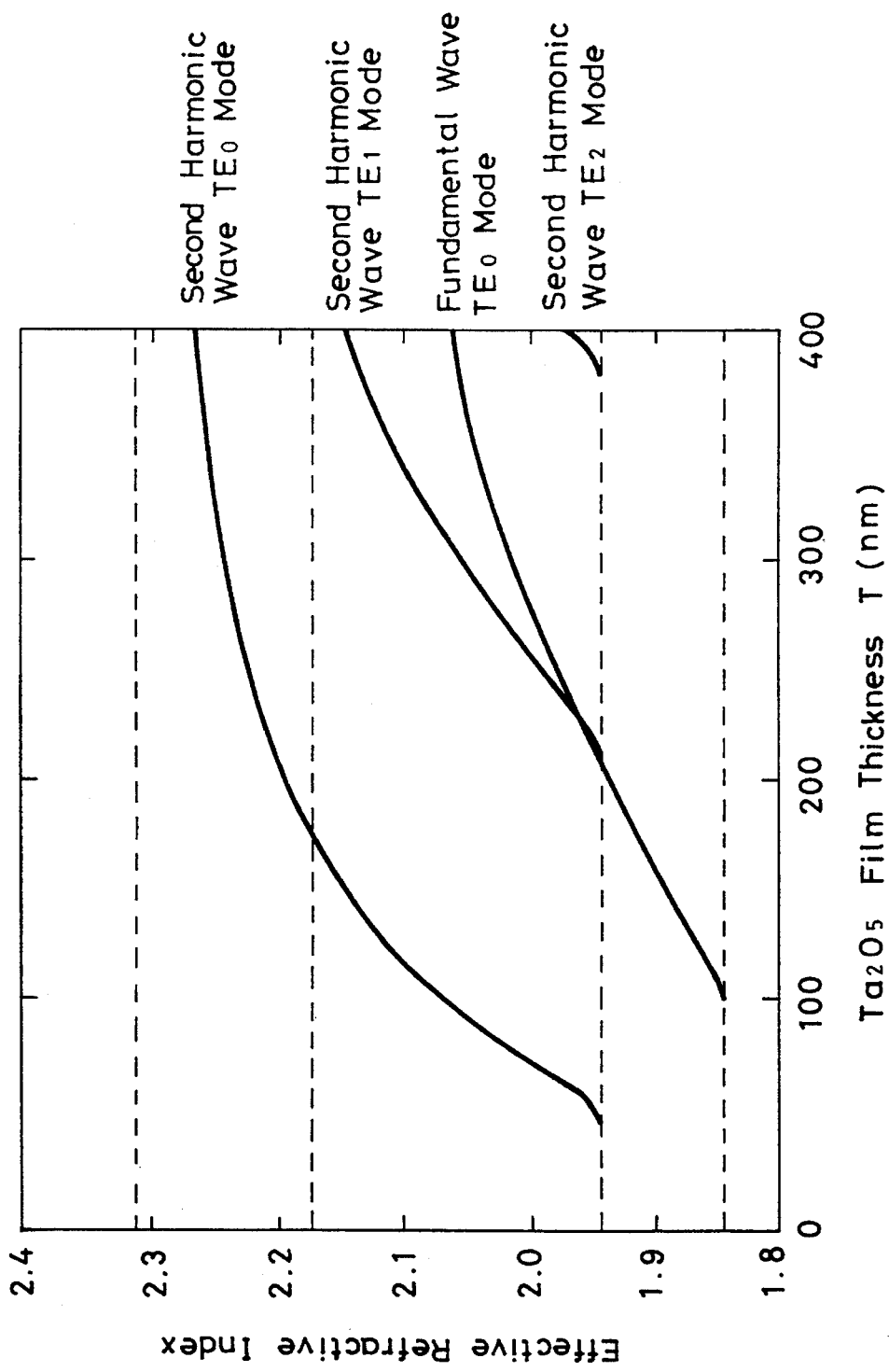
FIG. 2 is a modal dispersion graph according to the present invention.

FIG. 2 shows numerical data of modal dispersion curves obtained when a line width W of the pattern of the optical waveguide core 12 was selected to be 3.2 μm and the wavelength λ of the fundamental wave was selected to be 830 nm. In FIG. 2, a curve representing the fundamental $TE_0$ mode and a curve representing the second harmonic mode cross each other at a point where the $Ta_2O_5$ film thickness is 225 nm.

Figure 3:
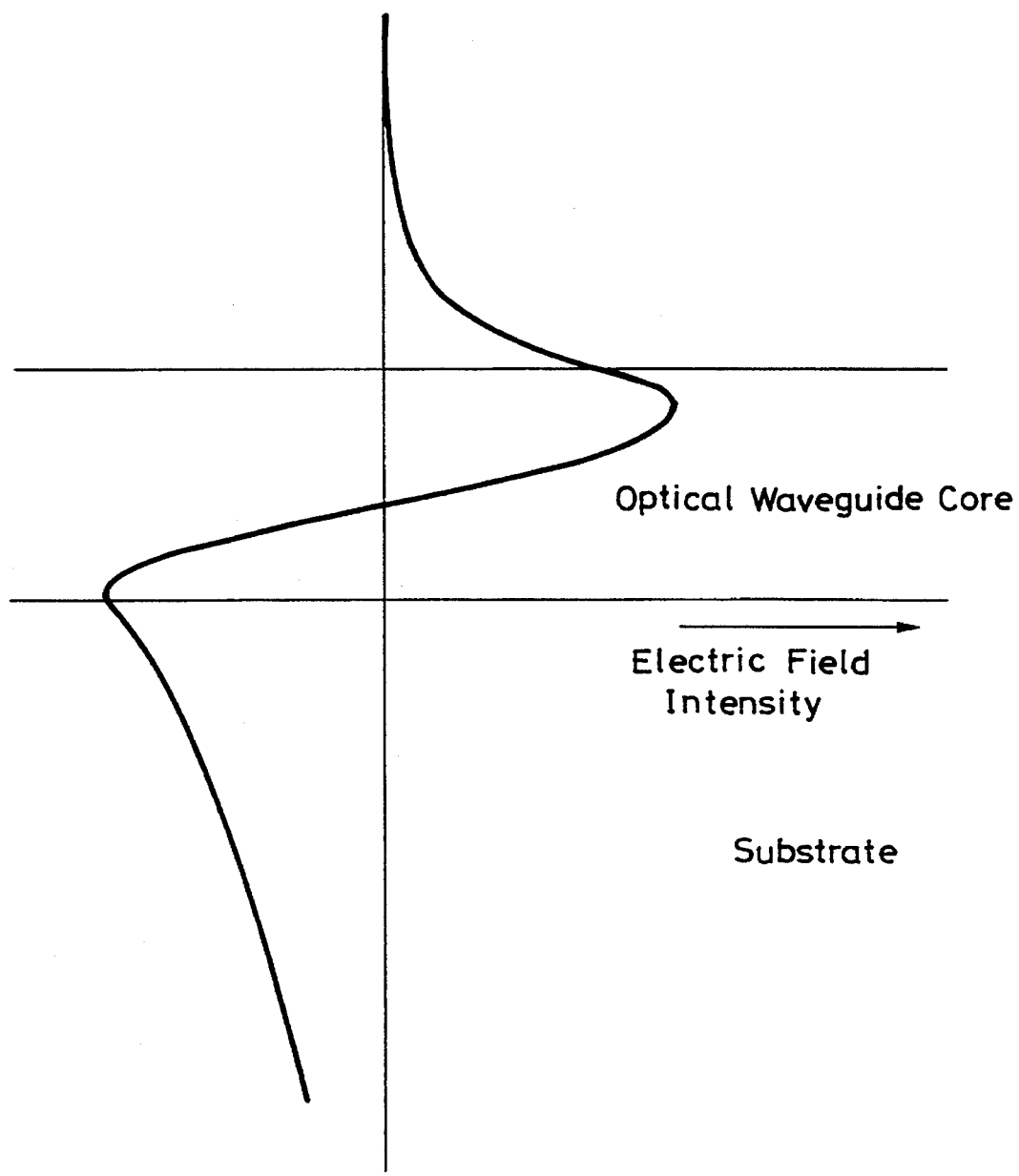
FIG. 3 is an electric field distribution diagram according to the present invention.

More specifically, phase-matching of the guided mode type is achieved. In such optical waveguide, the wavelength of the fundamental wave in the $TE_0$ mode is converted into that of the second harmonic wave in the $TE_1$ mode. In this case, the second harmonic $TE_1$ mode has one node, as shown by an electric field distribution in FIG. 3, because the first-order mode exists in the $Ta_2O_5$ film thickness direction. However, a refractive index of $Ta_2O_5$ forming the optical waveguide core 12 is 2.309 which is larger than a refractive index 1.947 of $KTiOPO_4$ by 0.362 and which is also larger than a refractive index 1.47 of $SiO_2$ forming the dielectric loaded strip, i.e., the cladding layer 13 by 0.839.

Figure 4:
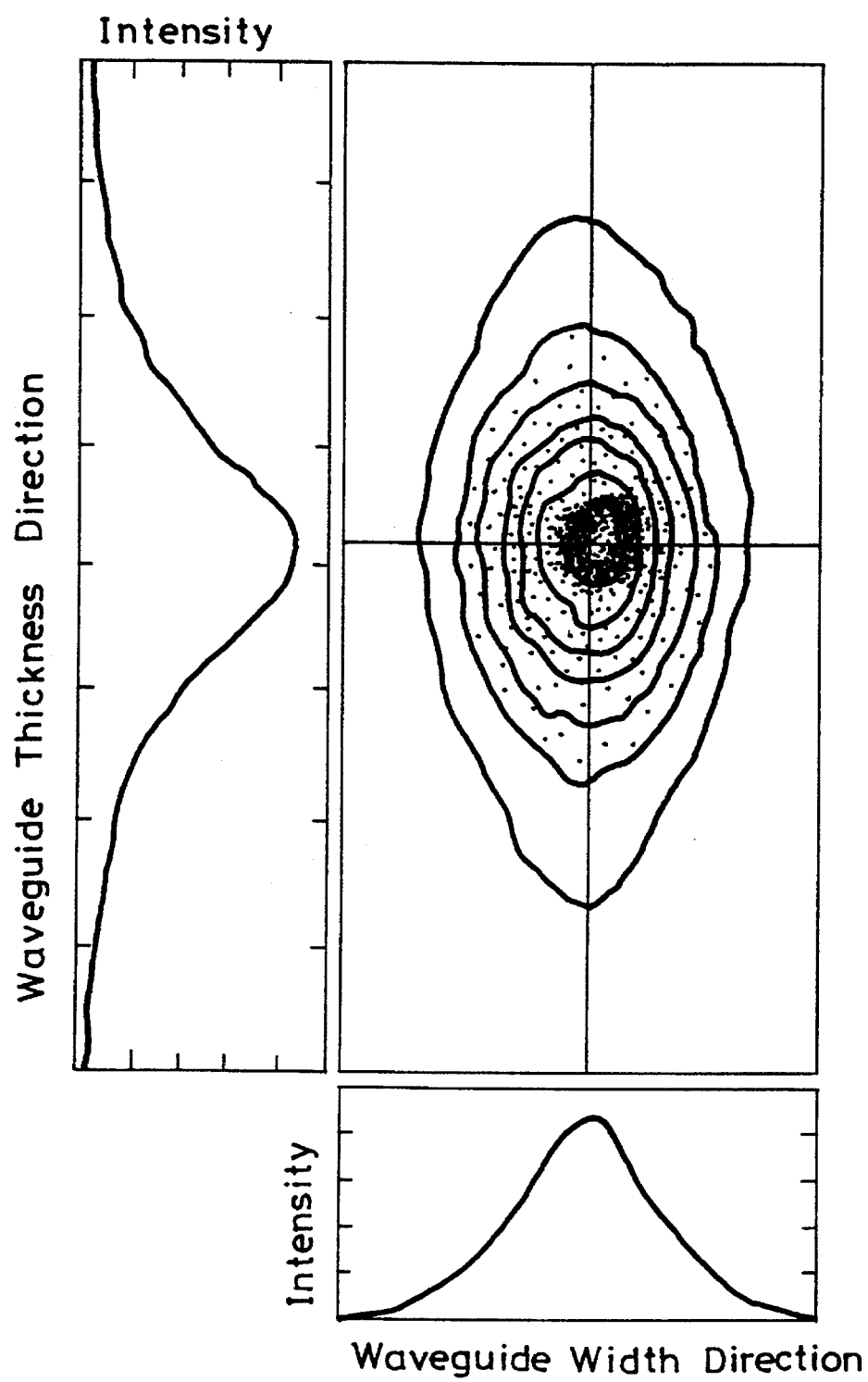
FIG. 4 is a diagram showing a far field pattern emitted to the air out of an exit end of the optical waveguide device according to the present invention.

Also, the $Ta_2O_5$ film thickness of the optical waveguide core 12 is 225 nm which is sufficiently much smaller than the wavelength 415 nm of the second harmonic wave in the air. Therefore, the guided light is confined in a region sufficiently smaller than the wavelength of the second harmonic wave in the air and then guided. Thus, when the guided wave is emitted to the air out of the exit end of the optical waveguide device, the far field pattern thereof has no far field pattern and has a single peak intensity distribution as shown in FIG. 4.

Further, when a length L of the optical waveguide device was selected to be 4.1 mm, a second harmonic wave of a power of 9.5 mW was obtained from a fundamental wave of a power of 96 mW. This is a normalized conversion efficiency of 610%/$Wcm^2$ and is one of the highest normalized conversion efficiencies among presently recognized conversion efficiencies of the wavelength converter of optical waveguide device type.

A process of manufacturing the optical waveguide device shown in FIG. 1 will be described below with reference to FIGS. 5A through 5E.

Figure 5A:
FIGS. 5A through 5E are enlarged schematic perspective views showing a process of manufacturing the optical waveguide device shown in FIG. 1.

First, as shown in FIG. 5A, a thin film of $Ta_2O_5$ is deposited as an optical waveguide core 12 on a nonlinear optical crystalline substrate 11 in the form of a single-crystal a plate of KTP which has been optically polished, by low pressure chemical vapor deposition (CVD) method, for example. The thin film of $Ta_2O_5$ should preferably have a thickness T of 190 nm or greater.

Figure 5B:
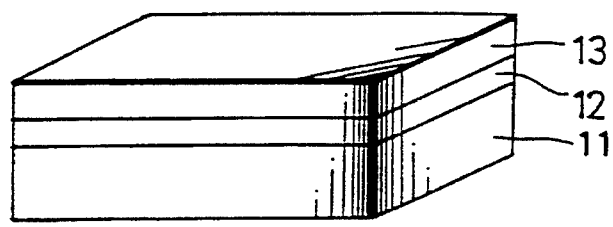

Then, as shown in FIG. 5B, a dielectric layer 13 made of $SiO_2$ or $SiO_2$ doped with $Ta_2O_5$ is deposited to a thickness of 500.0 nm, for example, on the thin film of $Ta_2O_5$ by sputtering or the like.

Figure 5C:
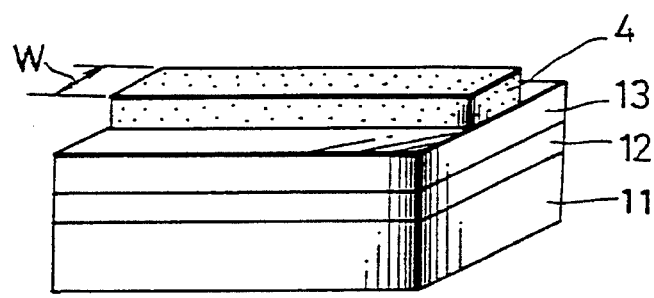
Figure 5D:
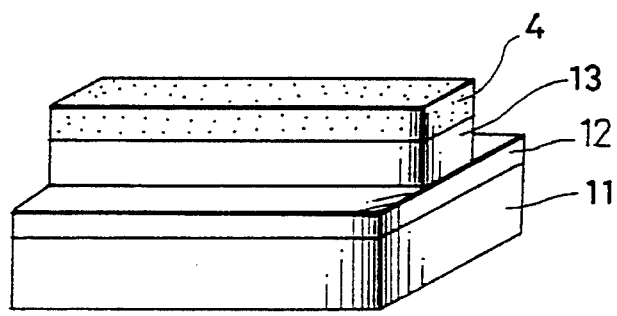

As shown in FIG. 5C, a mask 4 of a photoresist or the like which is of a predetermined linear pattern is thereafter formed on the dielectric layer 13. Specifically, for example, a photoresist is coated on the entire surface of the dielectric layer 13, and then exposed and developed into the linear mask 4. The mask 4 should preferably have a width W ranging from 1 to 5 μm.

Then, the dielectric layer 13 is wet-etched with an etchant of buffered hydrofluoric acid thereby forming the dielectric loaded strip 3 that is patterned into a linear configuration having the width W.

If the etchant is comprised of a mixture of hydrofluoric acid and ammon fluoride at a volume ratio of 12:100 and is used at room temperature, then the dielectric layer 13 can highly selectively be wet-etched in about 3 minutes because the etching rate of $SiO_2$ is about 170 nm/min. and the etching rate of $Ta_2O_5$ is 0.1 nm/min. or less.

The etching rate of $SiO_2$ doped with 40 mol % of $Ta_2O_5$ is 1.3 nm/min. Therefore, the dielectric layer 13 of $SiO_2$ doped with 40 mol % of $Ta_2O_5$ can also selectively be wet-etched.

Figure 5E:
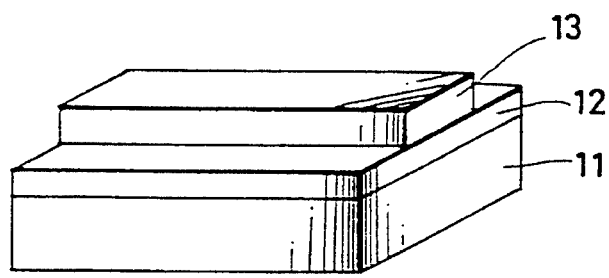

Thereafter, as shown in FIG. 5E, the mask 4 is removed, thus completing the strip loaded optical waveguide device.

When a fundamental wave having a wavelength λ is introduced into the waveguide core layer 12, the fundamental wave is confined in a region of the waveguide core layer 12 where the dielectric loaded strip 13 is formed, i.e., the optical waveguide. The fundamental wave is guided through the optical waveguide, and a portion thereof is converted into a second harmonic wave having a wavelength λ/2, and emitted from the exit end of the optical waveguide.

In an example, the width W of the dielectric loaded strip 13 was 3.2 μm, the thickness T of the optical waveguide in the form of a thin film of $Ta_2O_5$ was 225.0 nm, and the optical waveguide had a length L of 4.1 mm. When a fundamental TE guided mode having a wavelength of 830 nm and a power of 96 mW was guided in such an optical waveguide device, the optical waveguide device generated a second harmonic TE guided mode having a wavelength of 415 nm and a power of 9.5 mW. The normalized conversion efficiency of the optical waveguide device was 610%/Wcm$^2$, which is one of the highest conversion efficiencies among the presently recognized conversion efficiencies of the optical waveguide devices.

The optical waveguide device according to the above embodiment is basically similar in structure to a Cerenkov-radiation optical waveguide device proposed in Japanese patent application No. 5-16287, and can be modified into a Cerenkov-radiation optical waveguide device by controlling the thickness of the optical waveguide 2, i.e., the waveguide core layer 12, of $Ta_2O_5$.

Figure 6:
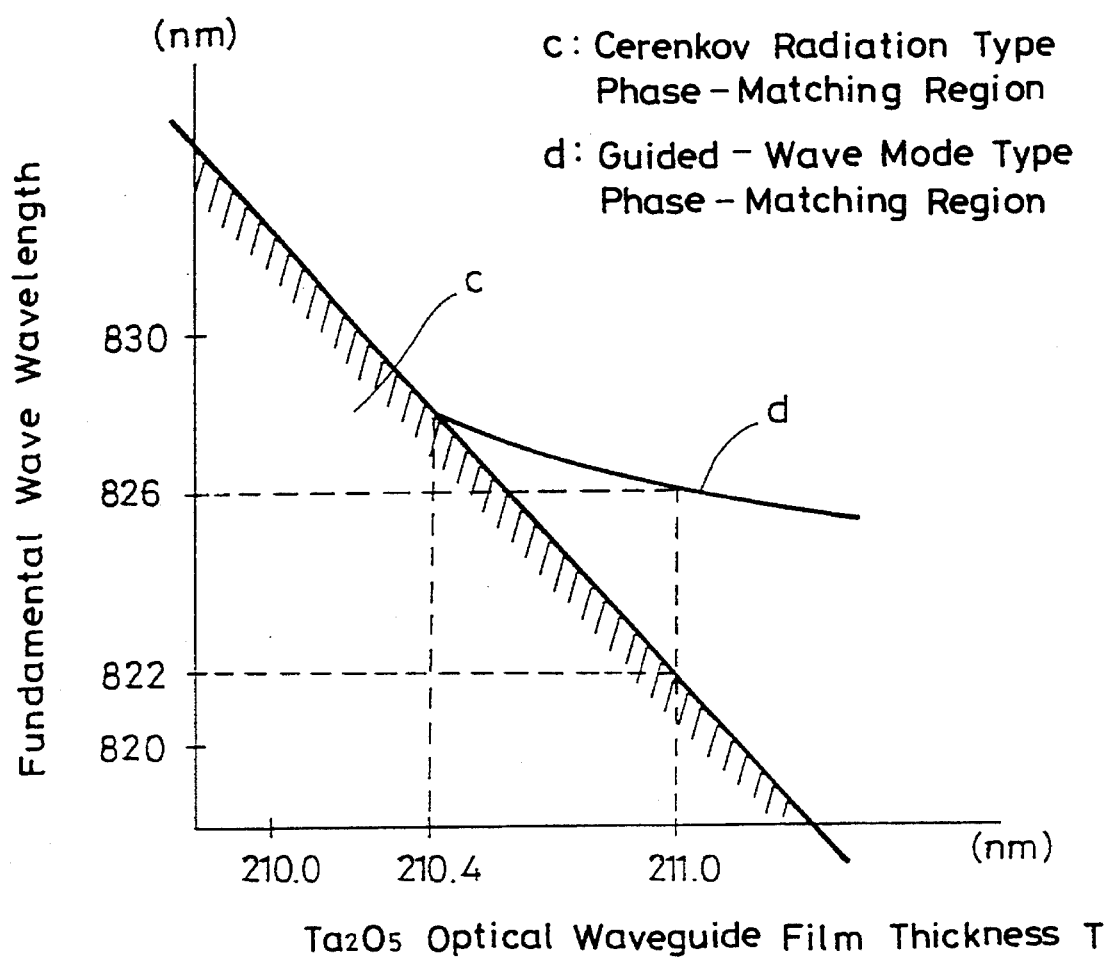
FIG. 6 is a diagram illustrative of the manner in which a second harmonic wave is generated in relation to fundamental wavelength and film thickness of an optical waveguide of $Ta_2O_5$.

FIG. 6 illustrates numerical data measured when the optical waveguide width W was 3.0 μm, confirming that phase matching of the Cerenkov-radiation type and phase matching of the guided mode type are made possible by controlling the thickness of the optical waveguide core of $Ta_2O_5$. The graph of FIG. 6 has a vertical axis representing fundamental wavelength and a horizontal axis representing optical waveguide thickness T.

In FIG. 6, a hatched region c is a region where phase matching of the Cerenkov-radiation type is possible, and a solid-line curve d indicates the condition where phase matching of the guided mode type is possible.

For example, when the thickness T of the optical waveguide of $Ta_2O_5$ is 211.0 nm, phase matching of the Cerenkov-radiation type is achieved if the fundamental wavelength is 822 nm or less, and phase matching of the guided mode type is achieved if the fundamental wavelength is 826 nm. According to the present invention, therefore, when the width of the optical waveguide 2 is 3.0 μm, the optical waveguide device makes it possible to achieve phase matching of the guided mode type for generating a second harmonic wave highly efficiently if the thickness T of the optical waveguide core of $Ta_2O_5$ is at least 210.4 nm.

The condition of the optical waveguide thickness and the fundamental wavelength, which accomplishes phase matching of the guided mode type, is affected by the width W of the optical waveguide. Therefore, the thickness T is available in a wider range, and should preferably be 190 nm or larger.

The optical waveguide device according to the present invention is therefore capable of achieving phase matching of the guided mode type as well as phase matching of the Cerenkov-radiation type for a high conversion efficiency by varying the thickness and width of the optical waveguide.

As described above, according to the embodiments of the present invention, even when the waveguide mode is a high-order mode of first-order or higher, the waveguide mode is confined in the region smaller that the wavelength thereof in the air in the optical waveguide core 12. Therefore, when the guided light beam is emitted to the outside, it has a single peak intensity distribution having no nodes.

Further, according to the embodiments of the present invention, if the substrate 11 is made of the nonlinear optical crystalline substrate and the optical waveguide according to this embodiment is applied to the wavelength converter, then a portion of the fundamental wave having the wavelength λ that was introduced into the optical waveguide core 12 is converted in wavelength into the second harmonic wave having the wavelength λ/2 while being guided in the optical waveguide core 12. Then, this second harmonic wave is guided in the optical waveguide core 12 and emitted to the outside.

In this case, even when the generated second harmonic wave is in the high-order more having nodes, the second harmonic wave is confined in the region smaller than the wavelength thereof in the optical waveguide core 12 and then guided. Therefore, when the second harmonic wave is emitted to the outside, it has a single peak intensity distribution having no nodes. Thus, the optical waveguide device according to the present invention can be suitably applied to the wavelength converter.

Further, according to the embodiments of the present invention, if the substrate is made of $KTiOPO_4$, then optical materials that should preferably have a refractive index larger than that of the $KTiOPO_4$ by 0.1 or greater to form the optical waveguide core 12 can be selected from a wider variety of optical materials because the refractive index of the $KTiOPO_4$ is small as compared with those of the nonlinear optical crystals. Also, if the fundamental TE mode is converted into the second harmonic TE mode or the fundamental TM mode is converted into the second harmonic TM mode, then the largest component $d_{33}$ among the nonlinear optical constants of the $KTiOPO_4$, thereby increasing the conversion efficiency with which the fundamental wave is converted into the second harmonic wave extremely.

Furthermore, according to the embodiments of the present invention, if the substrate is made of $KTiOPO_4$ and the optical waveguide core 12 is made of a dielectric material mainly made of $Ta_2O_5$, then the second harmonic wave of a power of 9.5 mW was obtained from the fundamental wave of a power of 96 mW with a single peak intensity distribution.

As described above, according to the embodiments of the present invention, the optical waveguide device can generate emitted light having a single peak response intensity distribution in which no nodes exist even when light is a guided light of high-order mode. Therefore, when this optical waveguide device is applied to the wavelength converter, the wavelength converter can generate a coherent light beam having a short wavelength with a single peak response intensity distribution.

Figure 7:
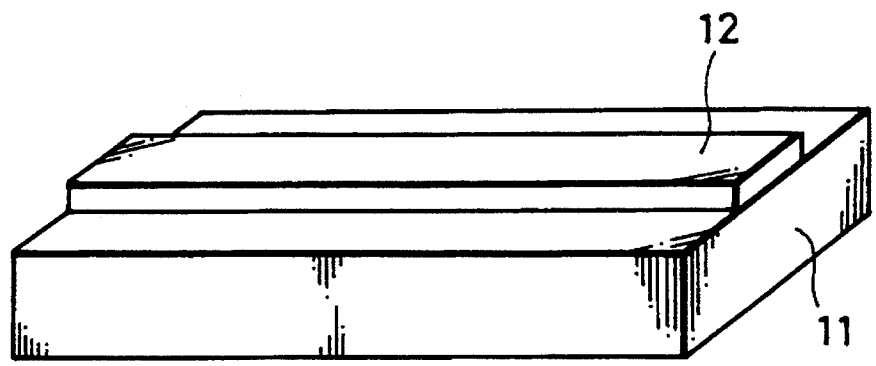
FIGS. 7 and 8 are perspective views showing optical waveguide devices according to other embodiments of the present invention, respectively.

FIG. 7 shows an optical waveguide device according to another embodiment of the present invention. In the embodiment shown in FIG. 7, the optical waveguide device is of a ridge-type structure, rather than of the strip loaded type, and includes an optical waveguide core 12 made of $Ta_2O_5$ or the like patterned into a linear configuration on a nonlinear optical crystalline substrate 11 made of KTP or the like.

Figure 8:
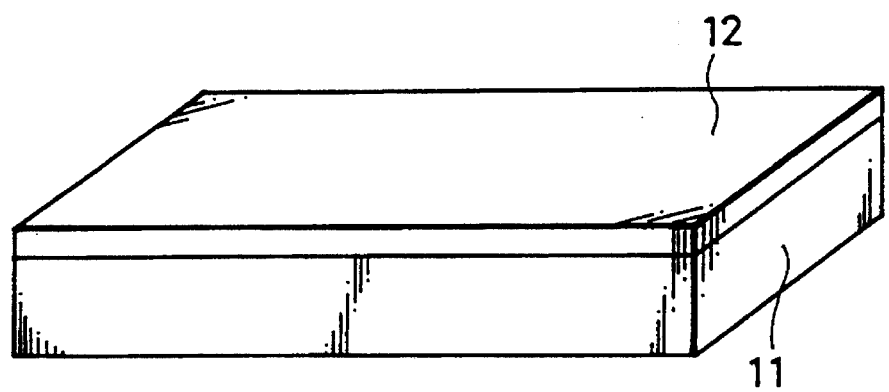

Also, as shown in FIG. 8, the optical waveguide core may be a planar waveguide core and the arrangement of the optical waveguide device of the present invention may be freely modified with similar action and effects being achieved.

In each of the embodiments described above, the nonlinear optical crystalline substrate and the optical waveguide core may be made of a dielectric material other than KTP a-plate and $Ta_2O_5$.

The optical waveguide device according to the present invention may be used as a light source for generating and applying a short-wavelength coherent light beam to an optical disc or the like to record information thereon at a high recording density. Since the optical waveguide device according to the present invention can be manufactured much more simply than the optical waveguide devices for achieving phase matching in the QPM mode, it can be manufactured with an improved yield at an improved production rate.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical waveguide device comprising:
   a substrate made of an optical material; and
   an optical waveguide core disposed on said substrate, wherein a refractive index of said optical material forming said optical waveguide core is larger than a refractive index of said substrate by 0.1 or greater, a thickness or width of said optical waveguide core is smaller than a wavelength of guided light in the air, and a wavelength of light of a high-order mode is emitted with an intensity distribution of a single peak response.

2. An optical waveguide device according to claim 1, wherein at least one of said substrate and said optical waveguide core is made of a nonlinear optical crystalline substrate, and said optical waveguide of a dielectric material disposed on said nonlinear optical crystalline substrate converts a fundamental wave having a wavelength $\lambda$ which is guided through the optical waveguide into a second harmonic wave having a wavelength $\lambda/2$, said second harmonic wave having the same polarization as the fundamental wave which is guided in the optical waveguide.

3. An optical waveguide device according to claim 1, wherein said nonlinear optical crystalline substrate is made of $KTiOPO_4$.

4. An optical waveguide device according to claim 1, wherein said dielectric material is comprised of $Ta_2O_5$.

5. An optical waveguide device according to claim 1, further comprising a dielectric loaded strip disposed on said optical waveguide core.

6. An optical waveguide device according to claim 5, wherein said dielectric loaded strip is made of $SiO_2$.

7. An optical waveguide device according to claim 5, wherein said dielectric loaded strip is made of $SiO_2$ doped with $Ta_2O_5$.

8. An optical waveguide device according to claim 1, wherein said optical waveguide comprises a ridge-type optical waveguide and said optical waveguide core is fabricated in a linear fashion.

9. An optical waveguide device according to claim 8, further comprising a cladding layer disposed on said nonlinear optical crystalline substrate and said ridge-type optical waveguide core and said cladding layer is made of $SiO_2$.

10. An optical waveguide device according to claim 8, further comprising a cladding layer disposed on said nonlinear optical crystalline substrate and said ridge-type optical waveguide core and said cladding layer is made of $SiO_2$ doped with $Ta_2O_5$.

* * * * *